(12) United States Patent
Bower et al.

(10) Patent No.: US 6,321,517 B1
(45) Date of Patent: Nov. 27, 2001

(54) LEAF BLOWING BLADE FOR A LAWN MOWER

(76) Inventors: David S. Bower; Michelle E. Diette, both of 23 Knollwood Dr., Vernon, CT (US) 06066

( * ) Notice: Subject to any disclaimer, the term of this patent is extended or adjusted under 35 U.S.C. 154(b) by 0 days.

(21) Appl. No.: 09/544,429

(22) Filed: Apr. 7, 2000

(51) Int. Cl.[7] ................................................. A01D 34/82
(52) U.S. Cl. ............................................. 56/255; 56/17.3
(58) Field of Search ........................... 56/255, 295, 17.3, 56/13.3, 12.8, 202, 203; 15/405, 331; 417/279, 313; 415/121.2, 169.1, 216

(56) References Cited

U.S. PATENT DOCUMENTS

| | | |
|---|---|---|
| D. 370,489 | 6/1996 | Taggett et al. . |
| 2,991,567 | 7/1961 | Erickson . |
| 3,048,869 | 8/1962 | Beatty . |
| 3,474,608 * | 10/1969 | Frick ........................................ 56/255 |
| 3,724,182 | 4/1973 | Long et al. . |
| 4,404,706 * | 9/1983 | Loyd ........................................ 15/344 |
| 5,240,189 * | 8/1993 | Majkrzak et al. ..................... 241/55 |
| 5,345,788 | 9/1994 | Jerry . |
| 6,073,305 * | 6/2000 | Hesskamp ............................. 15/405 |

* cited by examiner

Primary Examiner—Robert E. Pezzuto

(57) ABSTRACT

A lawn mower assembly having a leaf blowing blade includes a blade assembly for converting a lawnmower into a leaf blower. The blade assembly includes a substantially planar disc member that includes an outer perimeter edge. A connection portion extends outwardly from the disc member. The connection portion is designed for coupling to a blade attachment portion of the lawnmower such that the disc member is rotatable by the lawnmower. A plurality of spaced elongated blades extends downwardly from a lower surface of the disc member. The disc member is coupled to the lawnmower with the blades extending radially outward from the connection portion.

8 Claims, 3 Drawing Sheets

LEAF BLOWING BLADE FOR A LAWN MOWER

BACKGROUND OF THE INVENTION

1. Field of the Invention

The present invention relates to lawn mowers and lawnmower attachment devices and more particularly pertains to a new leaf blowing blade for a lawnmower for allowing a user who owns a lawnmower to easily convert it to a leaf blower.

2. Description of the Prior Art

The use of lawnmower attachment devices is known in the prior art. More specifically, lawnmower attachment devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,345,788; U.S. Pat. No. 5,163,276; U.S. Pat. No. 3,724,182; U.S. Pat. No. 2,991,567; U.S. Pat. No. DES. 370,489; and U.S. Pat. No. 3,048,869.

While these devices fulfill their respective, particular objectives and requirements, the aforementioned patents do not disclose a new leaf blowing blade for a lawnmower. The inventive device includes a blade assembly for converting a lawnmower into a leaf blower. The blade assembly includes a substantially planar disc member that includes an outer perimeter edge. A connection portion extends outwardly from the disc member. The connection portion is designed for coupling to a blade attachment portion of the lawnmower such that the disc member is rotatable by the lawnmower. A plurality of spaced elongated blades extend downwardly from a lower surface of the disc member. The disc member is coupled to the lawnmower with the blades extending radially outward from the connection portion.

In these respects, the leaf blowing blade for a lawnmower according to the present invention substantially departs from the conventional concepts and designs of the prior art, and in so doing provides an apparatus primarily developed for the purpose of allowing a user who owns a lawnmower to easily convert it to a leaf blower.

SUMMARY OF THE INVENTION

In view of the foregoing disadvantages inherent in the known types of lawnmower attachment devices now present in the prior art, the present invention provides a new leaf blowing blade for a lawnmower construction wherein the same can be utilized for allowing a user who owns a lawnmower to easily convert it to a leaf blower.

The general purpose of the present invention, which will be described subsequently in greater detail, is to provide a new leaf blowing blade for a lawnmower apparatus and method which has many of the advantages of the lawnmower attachment devices mentioned heretofore and many novel features that result in a new leaf blowing blade for a lawnmower which is not anticipated, rendered obvious, suggested, or even implied by any of the prior art lawnmower attachment devices, either alone or in any combination thereof.

To attain this, the present invention generally comprises a blade assembly for converting a lawnmower into a leaf blower. The blade assembly includes a substantially planar disc member that includes an outer perimeter edge. A connection portion extends outwardly from the disc member. The connection portion is designed for coupling to a blade attachment portion of the lawnmower such that the disc member is rotatable by the lawnmower. A plurality of spaced elongated blades extend downwardly from a lower surface of the disc member. The disc member is coupled to the lawnmower with the blades extending radially outward from the connection portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new leaf blowing blade for a lawnmower apparatus and method which has many of the advantages of the lawnmower attachment devices mentioned heretofore and many novel features that result in a new leaf blowing blade for a lawnmower which is not anticipated, rendered obvious, suggested, or even implied by any of the prior art lawnmower attachment devices, either alone or in any combination thereof.

It is another object of the present invention to provide a new leaf blowing blade for a lawnmower which may be easily and efficiently manufactured and marketed.

It is a further object of the present invention to provide a new leaf blowing blade for a lawnmower which is of a durable and reliable construction.

An even further object of the present invention is to provide a new leaf blowing blade for a lawnmower which is susceptible of a low cost of manufacture with regard to both materials and labor, and which accordingly is then susceptible of low prices of sale to the consuming public, thereby making such leaf blowing blade for a lawnmower economically available to the buying public.

Still yet another object of the present invention is to provide a new leaf blowing blade for a lawnmower which provides in the apparatuses and methods of the prior art some of the advantages thereof, while simultaneously overcoming some of the disadvantages normally associated therewith.

Still another object of the present invention is to provide a new leaf blowing blade for a lawnmower for allowing a user who owns a lawnmower to easily convert it to a leaf blower.

Yet another object of the present invention is to provide a new leaf blowing blade for a lawnmower which includes a blade assembly for converting a lawnmower into a leaf blower. The blade assembly includes a substantially planar disc member that includes an outer perimeter edge. A connection portion extends outwardly from the disc member. The connection portion is designed for coupling to a blade attachment portion of the lawnmower such that the disc member is rotatable by the lawnmower. A plurality of spaced elongated blades extends downwardly from a lower surface of the disc member. The disc member is coupled to the lawnmower with the blades extending radially outward from the connection portion.

Still yet another object of the present invention is to provide a new leaf blowing blade for a lawnmower that will require less storage area because additional leaf blowing machines are not needed.

Even still another object of the present invention is to provide a new leaf blowing blade for a lawnmower that will save the user money in labor, storage and maintenance costs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
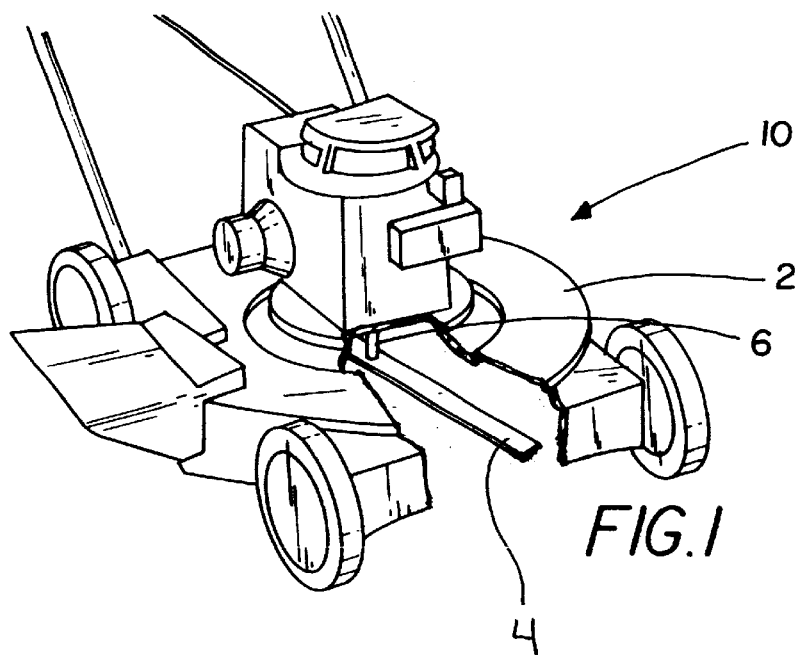
FIG. 1 is a perspective view of the lawnmower with a standard mowing blade.
Figure 2:
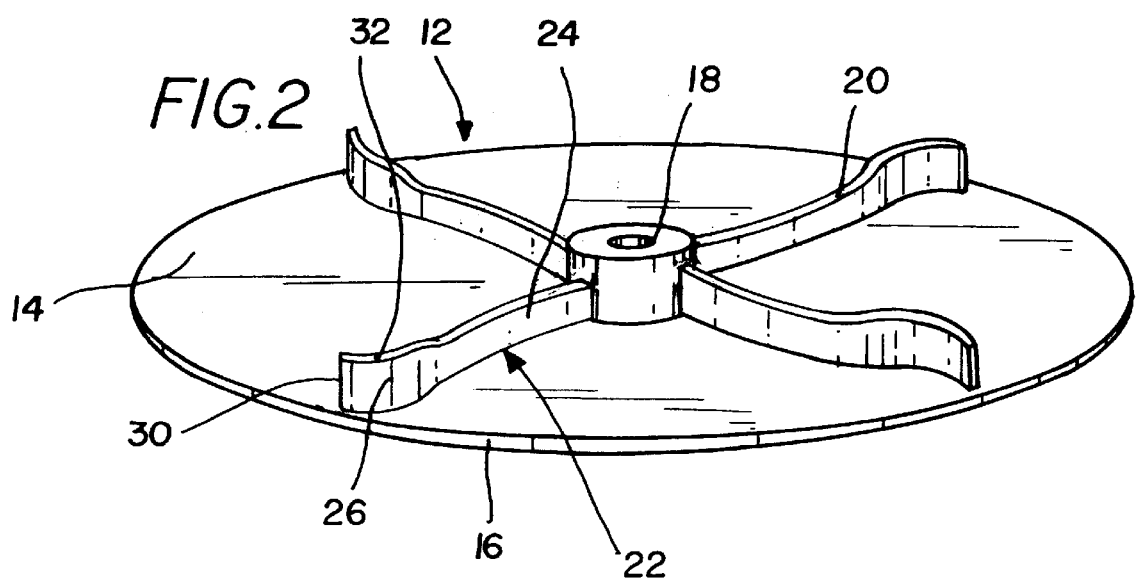
FIG. 2 is a perspective view of the present invention.
Figure 3:
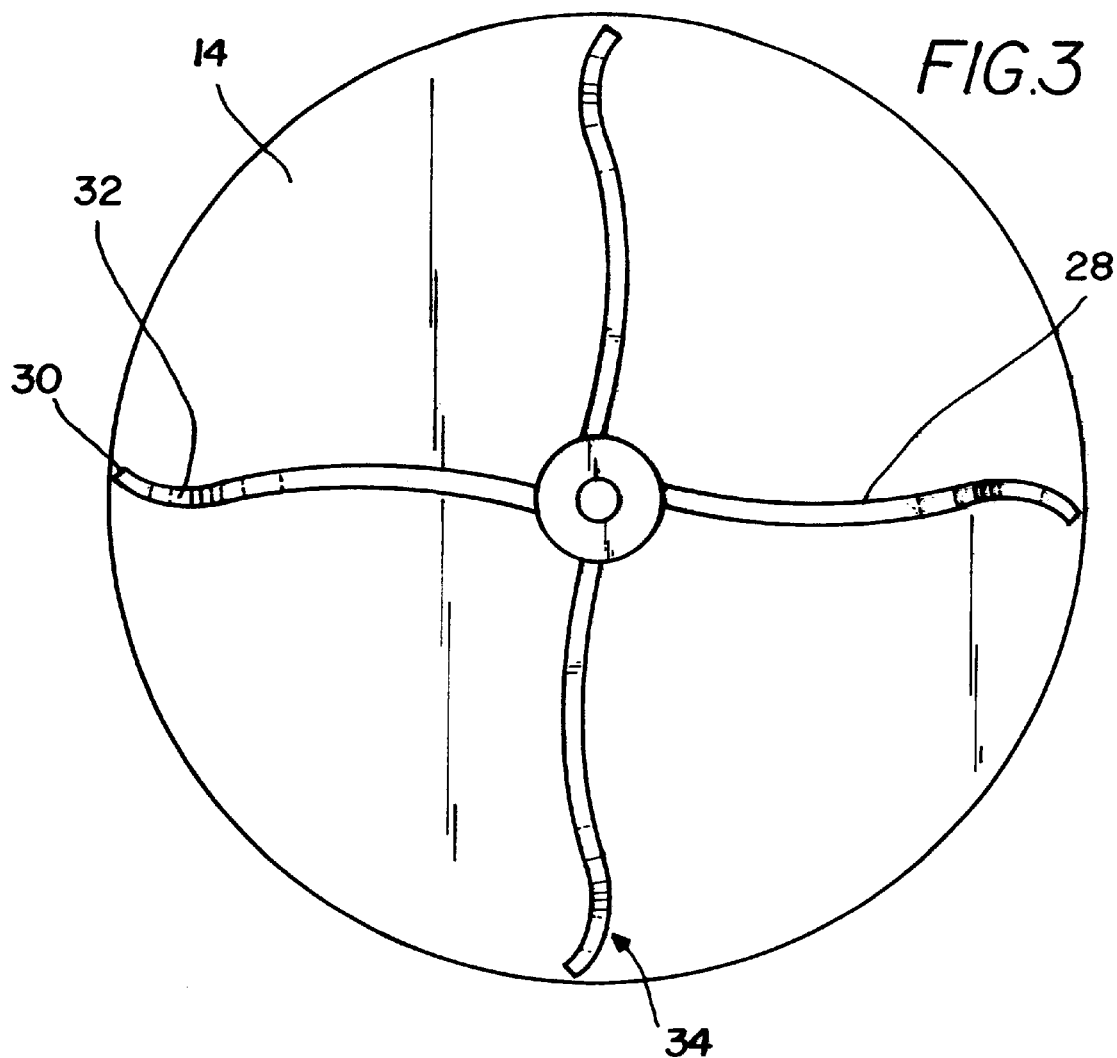
FIG. 3 is a top view of the present invention.
Figure 4:
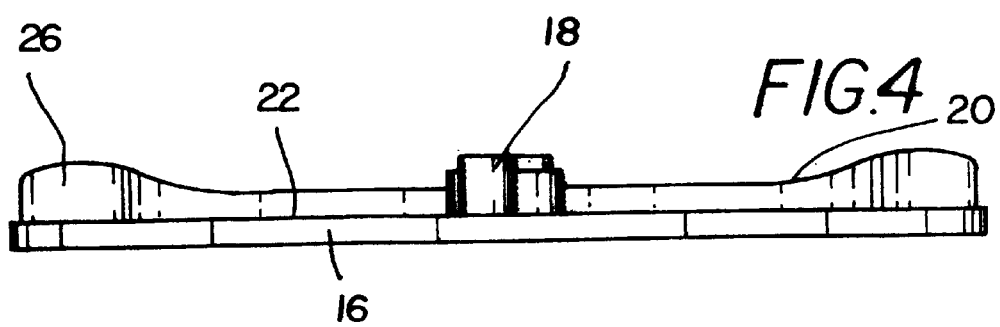
FIG. 4 is a side view of the present invention.
Figure 5:
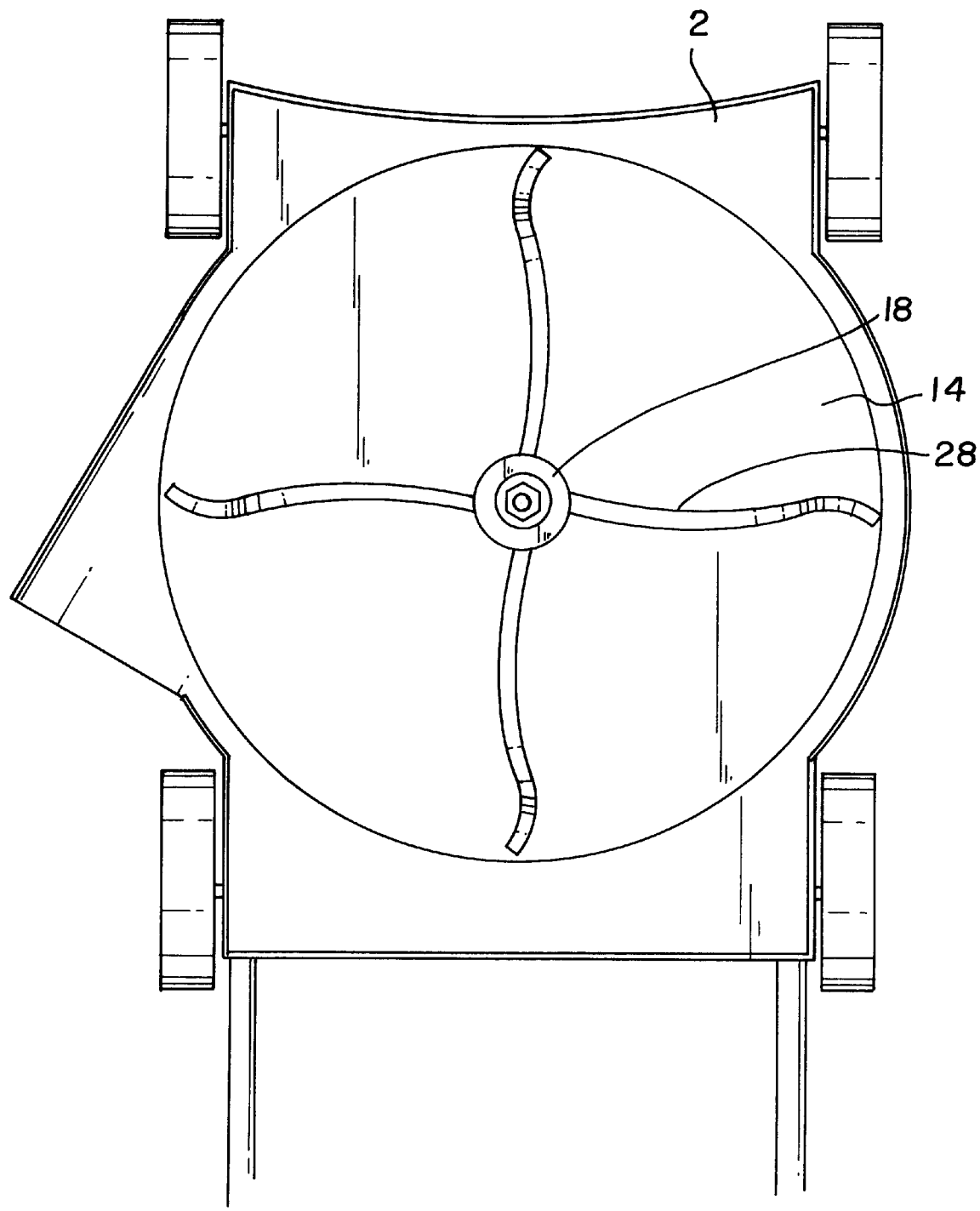
FIG. 5 is an underside view of the lawnmower with the blade assembly attached.

With reference now to the drawings, and in particular to FIGS. 1 through 5 thereof, a new leaf blowing blade for a lawnmower embodying the principles and concepts of the present invention and generally designated by the reference numeral 10 will be described.

As best illustrated in FIGS. 1 through 5, the leaf blowing blade for a lawnmower 12 generally comprises a lawnmower assembly 10 having a blade assembly for converting a lawnmower into a leaf blower. The lawnmower assembly 10 which includes a lawnmower 2 and a lawnmower blade 4 removably coupled to a blade attachment portion 6. A blade assembly 12 including a substantially planar disc member 14 includes an outer perimeter edge 16. A connection portion 18 extends outwardly from the disc member 14. The connection portion 18 is designed for coupling to the blade attachment portion 6 of the lawnmower 2 such that the disc member 14 is rotatable by the lawnmower 2. Four elongated blades 20 extending downwardly from a lower surface 22 of the disc member 14 when the disc member 14 is coupled to the lawnmower 2.

The blades 20 extend radially outward from the connection portion 18 in equally spaced relationship to each other. Each blade 20 includes an extension portion 24 and a paddle portion 26, the paddle portion 26 extends from a distal end 28 of the extension portion 24. The extension portion 24 includes a height defined between the disc member 14 and a distal edge 28 of the extension portion 24. In an embodiment, the height of the extension portion 24 is constant along a length of the extension portion 24. The paddle portion 26 includes a height defined between the disc member 14 and a distal edge 30 of the paddle portion 26. The distal edge 30 of the paddle portion 26 is arcuate such that the height of the paddle portion 26 is greatest in a medial portion 32 of the paddle portion 26. The height of the paddle portion 26 is greater than the height of the extension portion 24. Each blade extends orthogonally from the disc member 14 along a length of the blade 20 and each blade 20 includes a thickness defined between opposite faces of the blade.

The thickness of each blade 20 is substantially constant extending outwardly along each blade 20. Each blade 20 also includes a substantially S-shaped cross-section 34 taken along a longitudinal axis of each blade for maximizing air movement as the disc member 14 is rotated by the lawnmower 2.

In use, the leaf blowing blade attaches to a users mower, replacing the regular cutting blade. The user can now use the lawnmower to blow leaves.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A blade assembly for converting a lawnmower into a leaf blower, the blade assembly comprising:

a substantially planar disc member having an outer perimeter edge;

a connection portion extending outwardly from said disc member, said connection portion is adapted for coupling to a blade attachment portion of the lawnmower such that said disc member is rotatable by the lawnmower;

a plurality of spaced elongated blades extending downwardly from a lower surface of said disc member when said disc member is coupled to the lawnmower, said blades extending radially outward from said connection portion;

each said blade having an extension portion and a paddle portion, said paddle portion extending from a distal end of said extension portion; and each blade having a substantially S-shaped cross-section taken along a longitudinal axis of each said blade for maximizing air movement as said disc member is rotated, said paddle portion of each of said blades having a degree of curvature greater than a degree of curvature said extension portion such that said paddle portion is adapted for moving air at a greater speed than said extension portion for forcing debris away from said blades.

2. The blade assembly of claim 1, further comprising:

each blade having a thickness defined between opposite faces of said blade, said thickness of each blade is substantially constant extending outwardly along each said blade.

3. The blade assembly of claim 1, further comprising:

said extension portion having a height defined between said disc member and a distal edge of said extension portion, said height of said extension portion is constant along a length of said extension portion.

4. The blade assembly of claim 3, further comprising:

said paddle portion having a height defined between said disc member and a distal edge of said paddle portion, said distal edge of said paddle portion is arcuate such that said height of said paddle portion is largest in a medial portion of said paddle portion.

5. The blade assembly of claim 4, further comprising:

said height of said paddle portion being greater than said height of said extension portion.

6. The blade assembly of claim 1, further comprising:

each blade extending orthogonally from said disc member along a length of said blade.

7. A blade assembly for converting a lawnmower into a leaf blower, the blade assembly comprising:

a substantially planar disc member having an outer perimeter edge;

a connection portion extending outwardly from said disc member, said connection portion is adapted for coupling to a blade attachment portion of the lawnmower such that said disc member is rotatable by said lawnmower; and a plurality of spaced elongated blades extending downwardly from a lower surface of said disc member when said disc member is coupled to the lawnmower, said blades extending radially outward from said connection portion, each blade having an upper edge integrally coupled to said disc member along a length of said upper edge;

each said blade having an extension portion and a paddle portion, said paddle portion extending from a distal end of said extension portion;

said extension portion having a height defined between said disc member and a distal edge of said extension portion, said height of said extension portion is constant along a length of said extension portion;

said paddle portion having a height defined between said disc member and a distal edge of said paddle portion, said distal edge of said paddle portion is arcuate such that said height of said paddle portion is largest in a medial portion of said paddle portion;

said height of said paddle portion is greater than said height of said extension portion;

each blade extending orthogonally from said disc member along a length of said blade;

each blade having a thickness defined between opposite faces of said blade, said thickness of each blade is substantially constant extending outwardly along each said blade; and each blade having a substantially S-shaped cross-section taken along a longitudinal axis of each said blade for maximizing air movement as said disc member is rotated, said paddle portion of each of said blades having a degree of curvature greater than a degree of curvature said extension portion such that said paddle portion is adapted for moving air at a greater speed than said extension portion for forcing debris away from said blades.

8. A lawnmower assembly having a blade assembly for converting a lawnmower into a leaf blower, the lawnmower assembly comprising:

a lawnmower having a lawnmower blade removably coupled to a blade attachment portion; and a blade assembly including a substantially planar disc member having an outer perimeter edge, a connection portion extending outwardly from said disc member, said connection portion is for coupling to said blade attachment portion of said lawnmower such that said disc member is rotatable by said lawnmower, four elongated blades extending downwardly from a lower surface of said disc member when said disc member is coupled to said lawnmower, said blades extending radially outward from said connection portion in equally spaced relationship to each other, each said blade having an extension portion and a paddle portion, said paddle portion extending from a distal end of said extension portion, said extension portion having a height defined between said disc member and a distal edge of said extension portion, said height of said extension portion is constant along a length of said extension portion, said paddle portion having a height defined between said disc member and a distal edge of said paddle portion, said distal edge of said paddle portion is arcuate such that said height of said paddle portion is largest in a medial portion of said paddle portion, said height of said paddle portion is greater than said height of said extension portion, each blade extending orthogonally from said disc member along a length of said blade, each blade having a thickness defined between opposite faces of said blade, said thickness of each blade is substantially constant extending outwardly along each said blade, and each blade having a substantially S-shaped cross-section taken along a longitudinal axis of each said blade for maximizing air movement as said disc member is rotated by said lawnmower, said paddle portion of each of said blades having a degree of curvature greater than a degree of curvature said extension portion such that said paddle portion is adapted for moving air at a greater speed than said extension portion for forcing debris away from said blades.

* * * * *